(12) United States Patent
Dobrenko et al.

(10) Patent No.: US 10,288,915 B2
(45) Date of Patent: May 14, 2019

(54) DIMMER AND SWITCH SUITABLE FOR DRIVING A CAPACITIVE OR COMPLEX CAPACITIVE-RESISTIVE LOAD SUCH AS LIQUID CRYSTAL FILM

(75) Inventors: Dimitri Dobrenko, Raanana (IL); Adrian Lofer, Kfar Sava (IL); Eyal Peso, Tel Aviv (IL)

(73) Assignee: GAUZY LTD., Raanana (IL)

( * ) Notice: Subject to any disclaimer, the term of this patent is extended or adjusted under 35 U.S.C. 154(b) by 1543 days.

(21) Appl. No.: 13/824,656

(22) PCT Filed: Sep. 26, 2011

(86) PCT No.: PCT/IL2011/000761
§ 371 (c)(1),
(2), (4) Date: Mar. 18, 2013

(87) PCT Pub. No.: WO2012/042518
PCT Pub. Date: Apr. 5, 2012

(65) Prior Publication Data
US 2013/0188105 A1    Jul. 25, 2013

Related U.S. Application Data

(60) Provisional application No. 61/386,728, filed on Sep. 27, 2010.

(51) Int. Cl.
*E06B 9/24* (2006.01)
*G02F 1/133* (2006.01)
(Continued)

(52) U.S. Cl.
CPC .......... *G02F 1/13306* (2013.01); *E06B 9/24* (2013.01); *G02F 1/133362* (2013.01); *E06B 2009/2464* (2013.01); *G02F 1/1334* (2013.01)

(58) Field of Classification Search
CPC ... E06B 9/24; E06B 2009/2464; G02F 1/1334
See application file for complete search history.

(56) References Cited

U.S. PATENT DOCUMENTS 4,471,196 A * 9/1984 Frank ............... H02M 7/53871
219/665
5,631,665 A    5/1997 Kuniharu et al.
(Continued)

FOREIGN PATENT DOCUMENTS

EP    1484634 A1    12/2004
EP    2622407 A1    8/2013
(Continued)

OTHER PUBLICATIONS http://en.wikipedia.org/w/index.php?title=Dimmer&oldid=452340281, Sep. 25, 2011.

*Primary Examiner* — Alexander P Gross

(57) ABSTRACT

A transparency adjustment system comprising a transparent physical element whose electrical behavior is that of a capacitive load; and a power dimmer apparatus operative to provide AC current to the transparent physical element to generate a set of transparency states including a plurality of transparency states other than full transparency. Included in the scope of the invention is a system which changes the state of a load such as LC film from transparent to translucent in a single step rather than gradually.

26 Claims, 11 Drawing Sheets

(51) Int. Cl.
*G02F 1/1333* (2006.01)
*G02F 1/1334* (2006.01)

(56) References Cited

U.S. PATENT DOCUMENTS

| | | | | |
|---|---|---|---|---|
| 2002/0089813 | A1* | 7/2002 | Yamamoto | G09G 3/3659 361/328 |
| 2006/0107616 | A1* | 5/2006 | Ratti | E04B 1/00 52/750 |
| 2007/0097484 | A1* | 5/2007 | Libretto | G02F 1/163 359/275 |
| 2007/0216375 | A1 | 9/2007 | Achart et al. | |
| 2008/0143896 | A1* | 6/2008 | Yurth | E06B 9/24 349/16 |
| 2010/0157186 | A1* | 6/2010 | Kim | G02F 1/134336 349/39 |
| 2010/0225240 | A1* | 9/2010 | Shearer | H05B 37/0263 315/247 |

FOREIGN PATENT DOCUMENTS

| | | |
|---|---|---|
| FR | 2749450 A1 | 12/1997 |
| JP | 6-068704 | 11/1994 |

\* cited by examiner

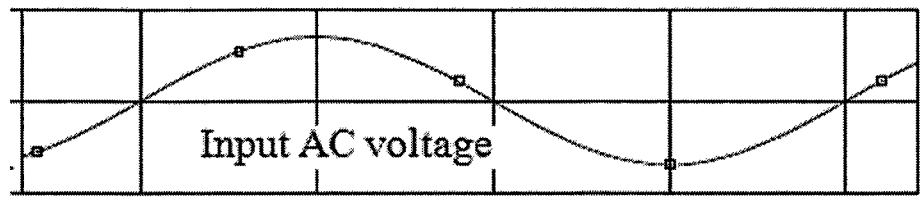
FIG.4A Input AC voltage
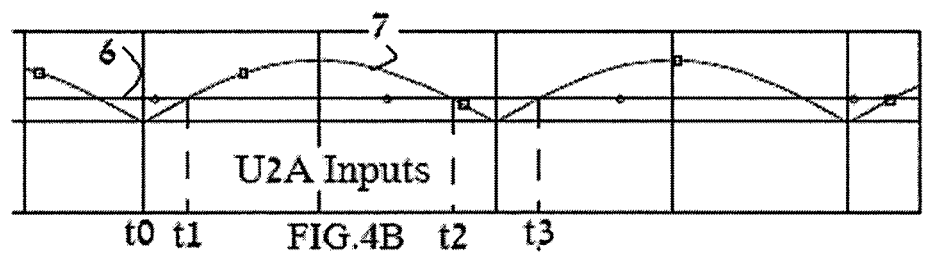
FIG.4B U2A Inputs
t0 t1  t2 t3
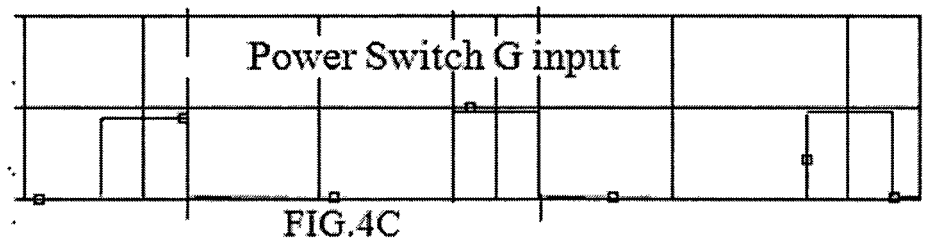
FIG.4C Power Switch G input
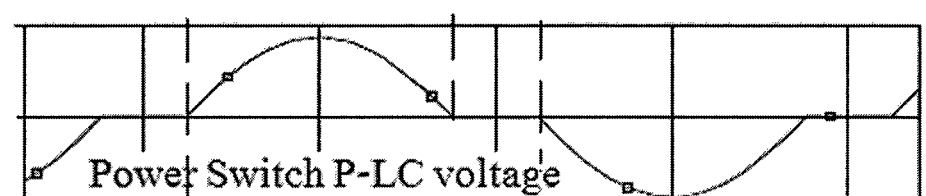
FIG.4D Power Switch P-LC voltage
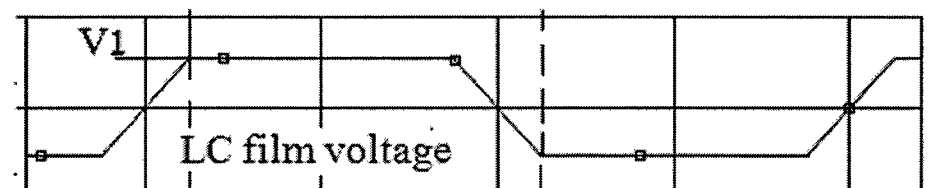
FIG.4E LC film voltage
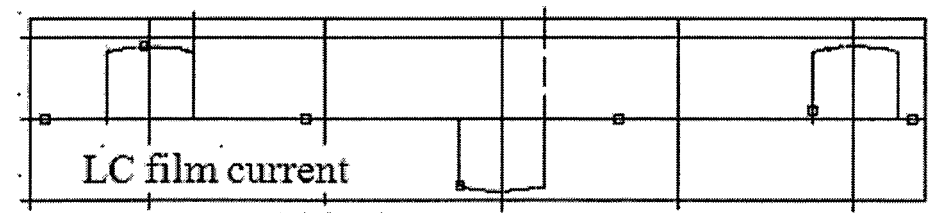
FIG.4F LC film current

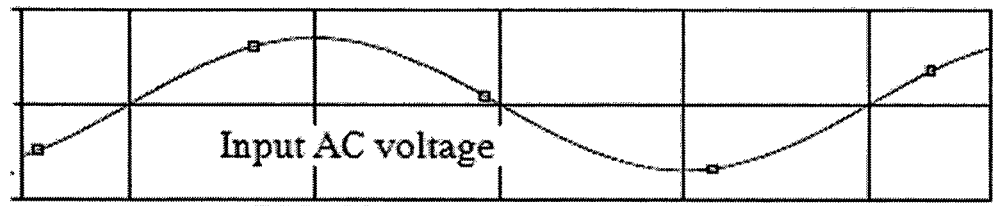
FIG.6A Input AC voltage
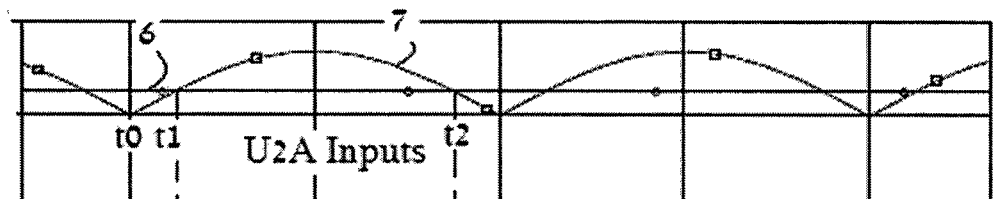
FIG.6B U2A Inputs
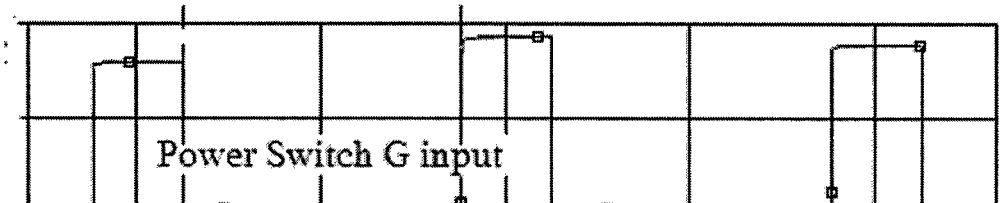
FIG.6C Power Switch G input
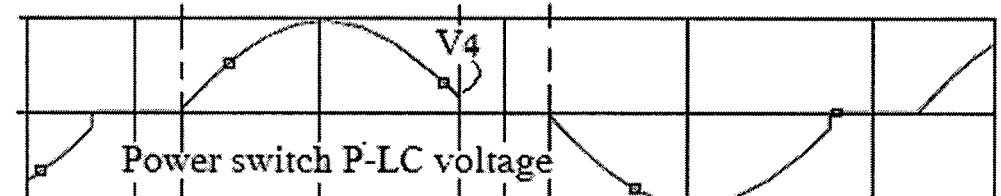
FIG.6D Power switch P-LC voltage
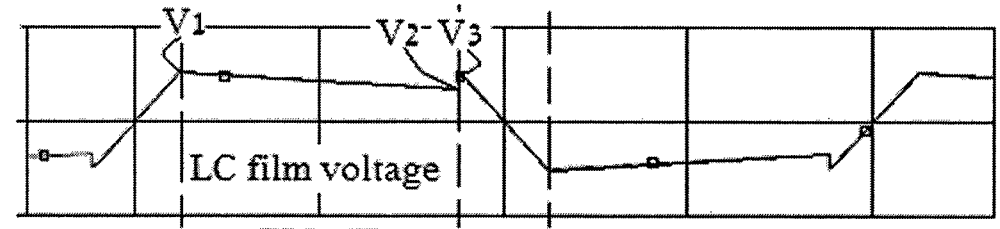
FIG.6E LC film voltage
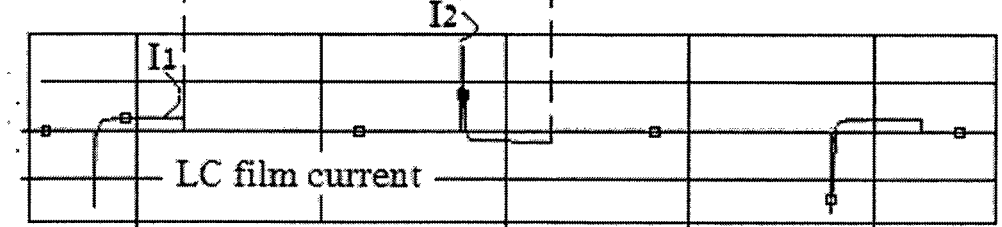
FIG.6F LC film current

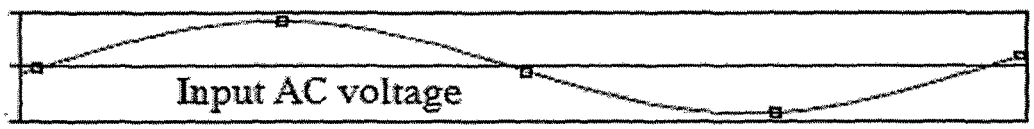
FIG. 8A Input AC voltage
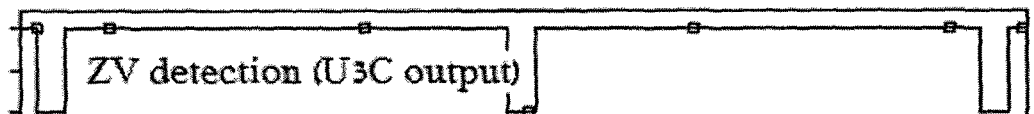
FIG. 8B ZV detection (U3C output)
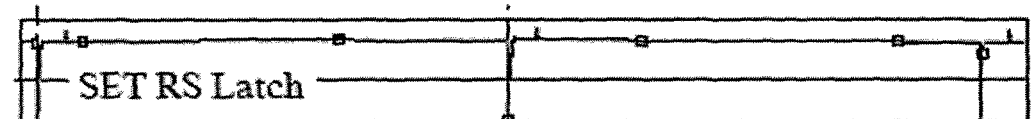
FIG. 8C SET RS Latch
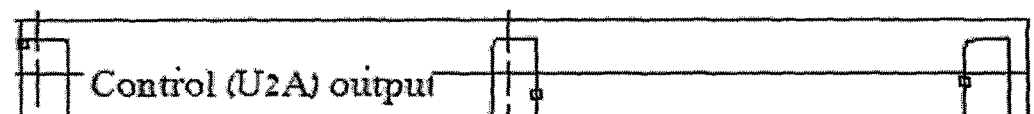
FIG. 8D Control (U2A) output
FIG. 8E RESET LS Latch
FIG. 8F Power Switch G input
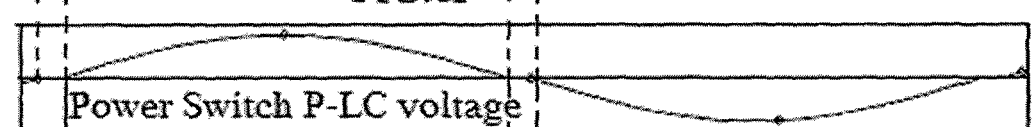
FIG. 8G Power Switch P-LC voltage
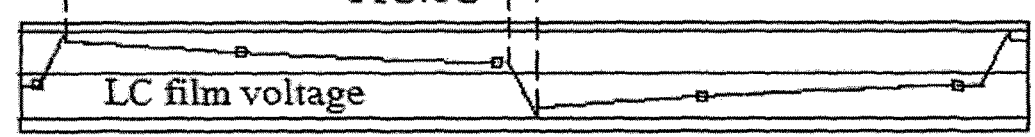
FIG. 8H LC film voltage
FIG. 8I LC film current

DIMMER AND SWITCH SUITABLE FOR DRIVING A CAPACITIVE OR COMPLEX CAPACITIVE-RESISTIVE LOAD SUCH AS LIQUID CRYSTAL FILM

REFERENCE TO CO-PENDING APPLICATIONS

Priority is claimed from U.S. provisional application No. 61/386,728, entitled "Dimmer and switch suitable for driving capacitive and complex capacitive-resistive load such as liquid crystal film" and filed 27 Sep. 2010.

FIELD OF THE INVENTION

The present invention relates generally to transparent objects and more particularly to affecting transparency of objects.

BACKGROUND OF THE INVENTION

Conventional technology pertaining to certain embodiments of the present invention is described in the following publications inter alia:

Wikipedia states that "Dimmers are devices used to vary the brightness of a light. By decreasing or increasing the RMS voltage and, hence, the mean power to the lamp, it is possible to vary the intensity of the light output. Although variable-voltage devices are used for various purposes, the term dimmer is generally reserved for those intended to control resistive incandescent, halogen and more recently compact fluorescent (CFL) lighting. More specialized equipment is needed to dim fluorescent, mercury vapor, solid state and other arc lighting.

Dimmers range in size from small units the size of a normal light switch used for domestic lighting to high power units used in large theatre or architectural lighting installations. Small domestic dimmers are generally directly controlled, although remote control systems (such as X10) are available . . . . Modern dimmers are built from silicon-controlled rectifiers (SCR) instead of potentiometers or variable resistors because they have higher efficiency . . . . Modern dimmer designs use microprocessors to convert the digital signal directly into a control signal for the switches. This has many advantages, giving closer control over the dimming, and giving the opportunity for diagnostic feedback to be sent digitally back to the lighting controller."

Types of conventional dimmers include the Saltwater dimmer, the Rheostat dimmer, the Autotransformer dimmer and the Thyristor dimmer.

Use of liquid crystal film-based windows with 2 states: transparent/opaque, is known. For example, LC SmartGlass is the registered trademark of Schott and is said to provide a solution which changes from opaque to transparent and back again e.g. for screens, energy-saving windows, bath/shower partitions, privacy screens, overhead lighting, and projection displays. The LC film is sandwiched between two glass panels, typically using a conventional glass lamination process.

The disclosures of all publications and patent documents mentioned in the specification, and of the publications and patent documents cited therein directly or indirectly, are hereby incorporated by reference.

SUMMARY OF THE INVENTION

Certain embodiments of the present invention aim at overcoming disadvantages of known dimmers. More specifically the present invention aims at providing a dimmer suitable for powering pure capacitive loads or complex RC loads, such as an LC film.

Certain embodiments of the present invention seek to provide a power dimmer for an LC film, which is connected serially to a power circuit and to AC voltage, such as mains.

In one embodiment of the present invention, a power switch comprises a power device such as MOSFET, a drain of which is connected to the positive outputs of a first diode bridge, and a source of which is connected to the negative outputs of the first diode bridge.

Another embodiment of the present invention also aims at providing a power circuit comprising two power devices such as MOSFETs connected in an anti series connection to one another, preferably source to source.

Another embodiment of the present invention provides a control circuit to achieve suitable timing of turning on and off the power switch. The timing is typically appropriate for driving capacitive loads.

Another embodiment of the present invention also aims at providing a control circuit suitable to drive a series-parallel combination of capacitive and resistive loads.

According to an embodiment of the present invention, an LC film is connected in series with a power switch, to AC voltage, such as mains.

According to an embodiment of the present invention, a control circuit includes a comparator, one input of which is connected to DC voltage, hereafter referred to as reference voltage or Vref. The reference voltage may be constant or may be alternated in order to respectively maintain constant, or change voltage applied to an LC film. Another input is connected to a voltage divider, typically fed through another diode bridge by rectified AC voltage.

According to an embodiment of the present invention, the comparator turns the gate of the power switch on and off through an opto-isolation circuit, based on a device such as an optocoupler or photocoupler, connected to the control input of the power switch via the driver circuit.

According to an embodiment of the present invention, the control circuit is fed preferably from the second diode bridge via the resistor and diode. The driver circuit is fed through another diode and resistor from the node where the LC film connects to the AC voltage.

According to a further embodiment of the present invention, the comparator performs one or both of the following two functions: the comparator sets a value of the AC voltage applied to LC film in accordance with the aforementioned reference voltage, and, the comparator effects turning on of the power switch under zero voltage crossing, meaning that the power switch is turned on when voltage drop across the power switch approaches zero.

According to a further embodiment of the present invention, a capacitor may be added in parallel to the complex RC load.

According to another embodiment, a zero voltage crossing detector circuit, henceforth referred to as a "detector", two high pass filters and a memory device, such as an RS-latch, are provided; the detector, via a first high pass filter, sets the RS-latch, and the aforementioned comparator resets, through the second high pass filter connected to the aforementioned optoisolation circuit, the RS latch, which, via the aforementioned driver circuits, turns the power switch respectively on and off.

According to another embodiment, a capacitor is added in parallel to the complex RC load, such as an LC (liquid crystal) film, in order to increase AC voltage applied to the load.

There is thus provided, according to certain embodiments of the present invention, a power dimmer apparatus providing AC current for a pure capacitive load or complex capacitor/resistor load such as an LC film, the apparatus comprising a power switch connected in series with the load and a control circuit to achieve proper timing of turning the power device on and off wherein, in order to drive the load, an output AC voltage applied to load is utilized, having at most a very small amount of DC voltage component.

Further according to certain embodiments of the present invention, the power device is configured as a series connection of two anti-serially MOSFET switches with an LC film.

Still further according to certain embodiments of the present invention, the power device is configured as a MOSFET switch connected serially with the load through a diode bridge.

Additionally provided, according to certain embodiments of the present invention, is a method for providing the apparatus shown and described herein.

Further according to certain embodiments of the present invention, the AC voltage applied to the load has a quasi trapezoidal form.

Also provided, according to certain embodiments of the present invention, is an apparatus for use in controlling the degree of transparency of an object by using a truncated periodical wave signal to control voltage applied to a liquid crystal which may or may not be laminated into glass.

Further provided, according to certain embodiments of the present invention, is an apparatus as above, which may reside in an enclosure.

Still further according to certain embodiments of the present invention, the transparency is controllable, e.g. like a dimmer, to achieve: one of a plurality of degrees of transparency other than zero; and zero.

Additionally according to certain embodiments of the present invention, the object comprises a window such as but not limited to a home, office, factory, or vehicle such as but not limited to an automobile, marine vehicle or airplane.

Further according to certain embodiments of the present invention, the above apparatus does not require a transformer for achieving transparency control.

Still further according to certain embodiments of the present invention, the above apparatus is operative for discovering of the ZVC condition by direct monitoring thereof, or by indirect assumption of when it occurs.

Additionally according to certain embodiments of the present invention, the apparatus is operative for discovering of the ZVC condition by direct monitoring and a capacitor is added in parallel to complex capacitive/resistive load.

Also provided, according to certain embodiments of the present invention, is any suitable combination of the embodiments illustrated or described herein.

Further according to certain embodiments of the present invention, the enclosure resembles an electrical socket.

Certain embodiments of the present invention seek to subject a load e.g. an LC film to voltage provided by a dimmer.

Certain embodiments of the present invention seek to provide an LC film which is selectably transparent as a function of the level of AC voltage applied to the film. A power dimmer providing AC current for an LC (liquid crystal) film comprising power switch connected in series with the LC film and control circuit to achieve proper timing of turning the power device on and off. In order to drive the LC film, an AC voltage of truncated sinusoidal form can be utilized with no or very small DC voltage component (usually below a few hundred millivolts e.g. 300 millivolts of DC voltage). This power device may be configured for example as a series connection of two anti-serially MOSFET switches with an LC film or in another embodiment as one MOSFET switch connected serially with the LC film through a diode bridge.

The present invention typically includes at least the following embodiments:

Embodiment 1

A transparency adjustment system comprising:
a transparent physical element, which may have an infinite plurality of transparent states, whose electrical behavior is that of a capacitive load; and
power dimmer apparatus operative to provide AC current to the transparent physical element to generate a set of transparency states including a plurality of transparency states other than full transparency.

Embodiment 2

A system according to embodiment 1 wherein the transparent physical element comprises a liquid crystal (LC) film.

Embodiment 3

A system according to embodiment 1 wherein the set of transparency states also includes a state of full transparency.

Embodiment 4

A system according to embodiment 1 wherein the load comprises a complex capacitor/resistor load, or alternatively, a pure capacitive load.

Embodiment 5

A system according to embodiment 1 wherein the power dimmer apparatus comprises:
a power switch powering the load; and
a control circuit controlling the power switch to turn on and off at selectable times.

Embodiment 6

A system according to embodiment 5 wherein, in order to drive the load, an output voltage is applied to the load, the output voltage including an amount of AC voltage wherein, amount of DC voltage if any, is less than 0.5% of the amount of AC voltage.

Embodiment 7

A system according to embodiment 5 wherein the power switch is connected in series with the load.

Embodiment 8

A system according to embodiment 2 wherein the power switch comprises a pair of anti-serially MOSFET switches connected in series with the LC film.

Embodiment 9

A system according to embodiment 1 wherein the power switch comprises:
a diode bridge; and
a MOSFET switch connected serially with the load via the diode bridge.

Embodiment 10

A system according to embodiment 1 wherein AC voltage applied to the load approximates a quasi trapezoidal form.

Embodiment 11

A system according to embodiment 1 wherein AC voltage applied to the load has a truncated sinusoidal form.

Embodiment 12

A system according to embodiment 2 wherein the liquid crystal film is laminated into a glass object thereby to control transparency of the glass object.

Embodiment 13

A system according to embodiment 12 wherein the glass object forms a window or door pane, or a door.

Embodiment 14

A system according to embodiment 13 wherein the window pane is mounted in a building.

Embodiment 15

A system according to embodiment 13 wherein the window pane is mounted in a vehicle such as an automobile, a marine vehicle and an aircraft.

Embodiment 16

A system according to embodiment 5 wherein AC voltage applied to the load has a truncated sinusoidal form which is truncated at a voltage level determined by the control circuit and applied via the power switch.

Embodiment 17

A system according to embodiment 2 wherein a maximum voltage level rating is defined for the liquid crystal film and wherein the power dimmer apparatus has a predetermined maximum voltage level which does not exceed the liquid crystal film's maximum voltage level rating.

Embodiment 18

A system according to embodiment 5 wherein the power switch has an input point comprising a gate and wherein the control circuit is connected to the power switch via a driver circuit controlling the power switch's input point.

Embodiment 19

A system according to embodiment 5 wherein the control circuit includes a comparator operative to receive and to compare:
an incoming level of AC voltage; and
a user-selected reference voltage;
and operative, when the incoming level of AC current reaches the user-selected reference voltage, to generate an output triggering truncation of sinusoidal AC voltage applied to the load.

Embodiment 20

A system according to embodiment 18 wherein the control circuit is connected to the driver circuit via an isolation circuit. This may be useful, for example, if the supply voltage is 220, whereas the LC films can only "tolerate" a smaller voltage, such as 40 V or 100 V.

Embodiment 21

A system according to embodiment 4 and also comprising a capacitor disposed in parallel to the complex load and operative to increase AC voltage applied to the complex load.

Embodiment 22

A system according to embodiment 5 and also comprising ZVC (zero-voltage-crossing) prediction circuitry, and wherein the power switch is not turned on unless very little voltage, if any, is predicted by the ZVC (zero-voltage-crossing) prediction circuitry to be present across the power switch.

Embodiment 23

A system according to embodiment 22 wherein the ZVC (zero-voltage-crossing) prediction circuitry assumes that LC voltage during a "floating" time interval will not change.

Embodiment 24

A system according to embodiment 5 and also comprising ZVC (zero-voltage-crossing) detection circuitry connected across the power switch, and wherein the power switch is not turned on unless very little voltage, if any, is detected by the ZVC detection circuitry across the power switch.

Embodiment 25

A system according to embodiment 22 and wherein the ZVC detection circuitry is operative to measure positive and negative half cycles of a sine input voltages across terminals P-VDD1 and LC-VDD1 of the power switch, respectively.

Embodiment 26

A system according to embodiment 24 wherein the capacitive load comprises a complex capacitor/resistor load, the system also comprising a capacitor in parallel to the complex capacitive/resistive load.

Embodiment 27

A system according to embodiment 1 wherein the power dimmer apparatus is manually controllable by a user.

Embodiment 28

A system according to embodiment 1 wherein the power dimmer apparatus is controllable by a computerized system such as a PC or smart home system.

Embodiment 29

A transparency adjustment method comprising:
providing a transparent physical element whose electrical behavior is that of a capacitive load; and
providing a power dimmer apparatus operative to provide AC current to the transparent physical element to generate a set of transparency states including a plurality of transparency states other than full transparency.

The ZVC detection circuitry is typically connected in such a way that it can measure both positive and negative half cycles of a sine input voltages across terminals P-VDD1 and LC-VDD1 correspondingly of a power switch. When the ZVC condition, in which no or very little voltage is present across the power switch, occurs, the power switch is turned on. Turning on at ZVC is advantageous in order to prevent large current spikes which otherwise would occur during turn on and which may cause radio frequency interference, and in extreme cases destroy power switch and/or film. Timing of ZVC is typically a function of relationships between capacitance and resistive components of the load.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all control functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The above devices may communicate via any conventional wired or wireless digital communication means, e.g. via a wired or cellular telephone network or a computer network such as the Internet.

The embodiments referred to above, and other embodiments, are described in detail in the next section.

Any trademark occurring in the text or drawings is the property of its owner and occurs herein merely to explain or illustrate one example of how an embodiment of the invention may be implemented.

Elements separately listed herein need not be distinct components and alternatively may be the same structure.

BRIEF DESCRIPTION OF THE DRAWINGS

Certain embodiments of the present invention are illustrated in the following drawings:

FIG. 4 includes graphs A-F of waveforms characterizing voltage/current which may be present in the dimmer and a capacitive load according to certain embodiments of the present invention, e.g. as shown in FIG. 3; graphs A-E being voltage vs. time graphs; graph F being a current vs. time graph.

FIG. 6 includes graphs A-F of waveforms characterizing voltage/current which may be present in dimmer and an LC film according to certain embodiments of the present invention, e.g. as shown in FIG. 5; graphs A-E being voltage vs. time graphs; graph F being a current vs. time graph.

FIG. 8 includes graphs A-I of waveforms characterizing current which may be present in dimmer and an LC film according to certain embodiments of the present invention, e.g. as shown in FIG. 7.

DETAILED DESCRIPTION OF CERTAIN EMBODIMENTS

Figure 1:
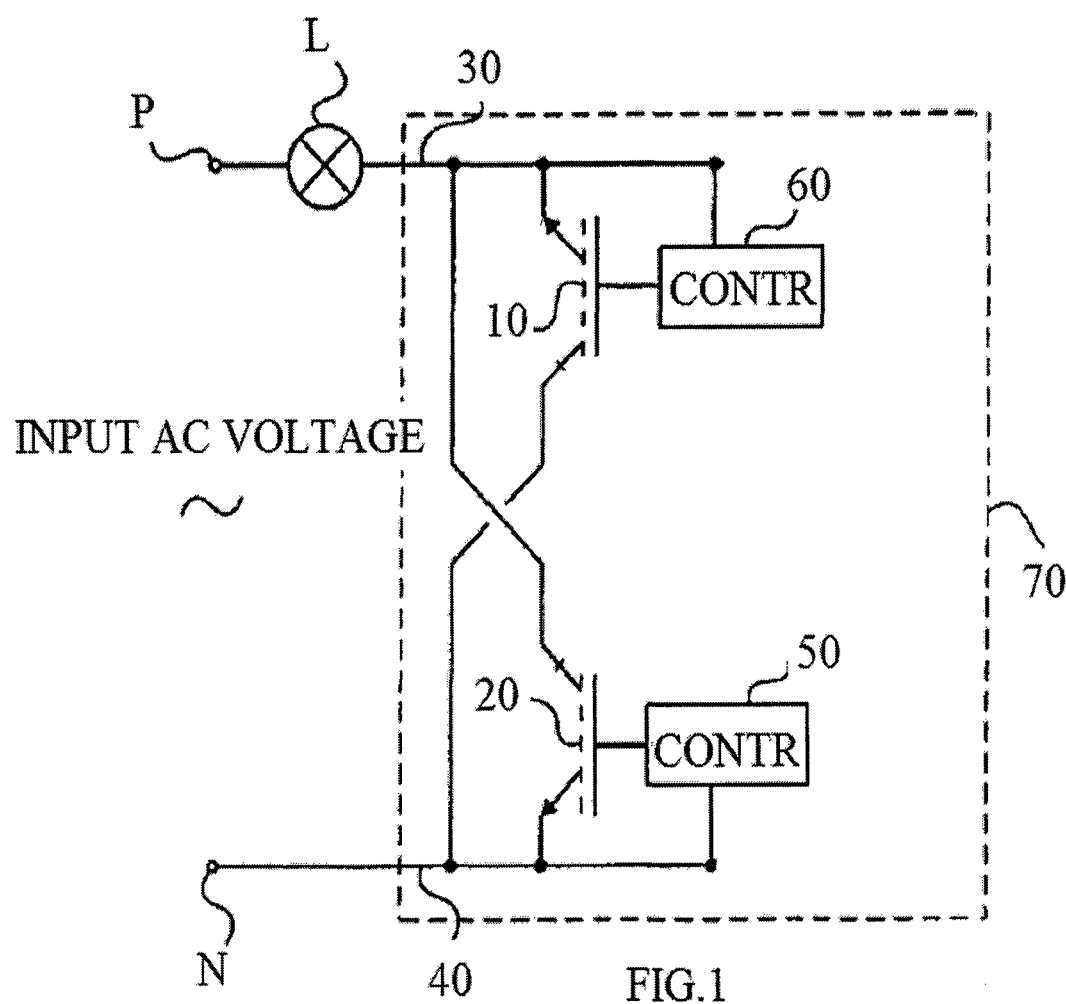
FIG. 1 is a Prior Art electrical diagram of a circuit for controlling a load L supplied by an AC voltage Vac.

Features and advantages of various embodiments of the present invention will be discussed in detail in the following non-limiting description of specific embodiments in connection with the accompanying drawings.

Identical elements have been designated with the same reference numbers in the different drawings. For clarity, certain circuit elements, which are not mandatory to understanding of the present invention, have not been shown in the drawings.

Certain embodiments of the present invention relate inter alia to the control of loads supplied by an AC voltage such as but not limited to the field of power dimmers suitable for powering LC film. These embodiments may for example be based on switches which are assembled anti-serially or may be based on a single switch connected to a load by means of a diode bridge.

Dimmers may be based on the use of triacs, the triggering of which is delayed at the beginning of each AC cycle. Such dimmers are not suitable for LC film which behaves like a complex capacitive-resistive load, hereafter referred to as a "complex RC load".

Prior art FIG. 1 schematically illustrates a conventional example circuit 7 for controlling a load L supplied by an AC voltage VAC. Two switches 10 and 20 are assembled in an anti-parallel configuration between two power terminals 30 and 40 of the dimmer, and are connected in series with a load L between two terminals P and N of an AC voltage. Each switch 10, 20 has its own control circuit 50 and 60, generating a control signal.

In conventional circuits of this type, the positive and negative sinus half waves pass via two different switches 10 and 20 and are controlled by two separate control circuits, 50 and 60, essentially causing some DC current to pass through the load L, due to tolerances of components of the two circuits. While this may be acceptable for inductive and resistive loads such as fluorescent lamp ballasts and tungsten lamps, it is unsuitable for an LC film, which might be damaged by relatively small amounts of DC voltage.

Figure 2A:
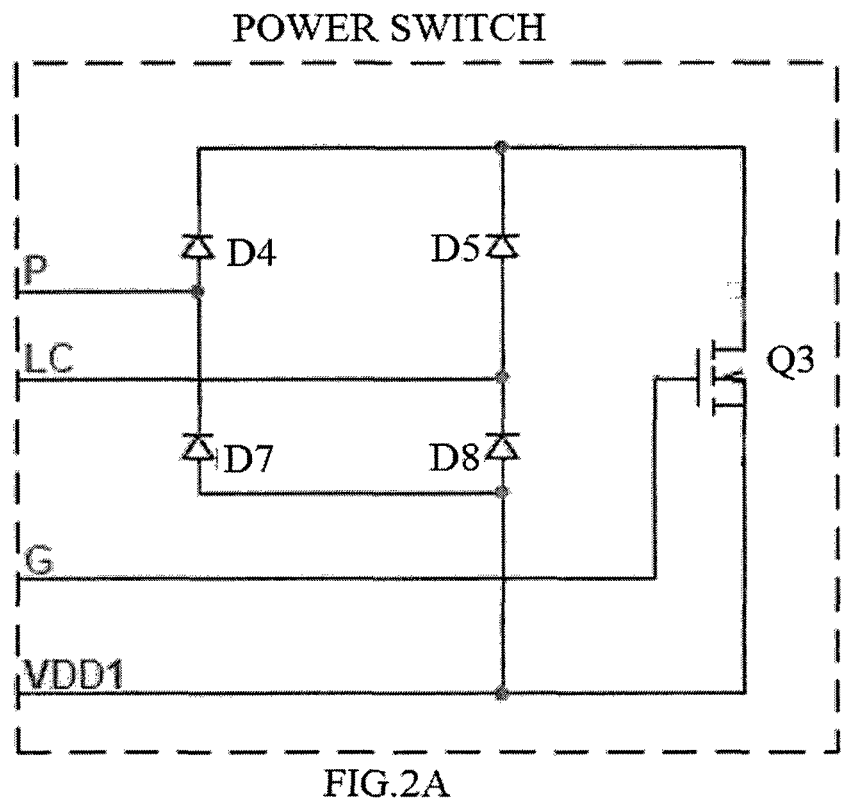
FIGS. 2A and 2B are electrical diagrams of power switch implementations useful in conjunction with certain embodiments of the present invention, such that in FIG. 2A, the power switch comprises a diode bridge and a MOSFET switch connected serially with the load via the diode bridge and in FIG. 2b, the power switch comprises a pair of anti-serial MOSFET switches connected in series with the LC film.

FIG. 2A shows one embodiment of a power switch capable of conducting or blocking AC current between P and LC nodes. The power switch may for example include 4 diodes D4, D5, D7 and D8, configured as a full wave diode bridge, a positive pole of which is connected to the drain, and the negative pole of which is connected to the source, of MOSFET Q3. The power switch may be controlled by DC voltage applied between nodes G and VDD1. When DC voltage is applied between G and VDD1, the power switch conducts AC current, whereas with zero voltage the AC current is blocked.

Figure 2B:
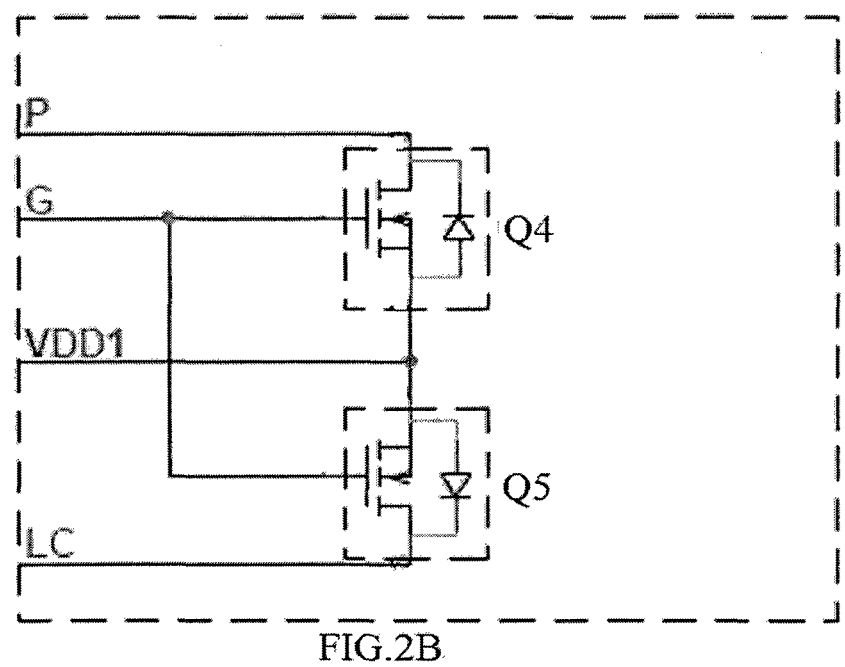

FIG. 2B illustrates another embodiment of the power switch, capable of conducting or blocking AC current between P and LC nodes. The power switch of FIG. 2B typically comprises two MOSFET's connected anti-serially with two sources and two gates tied together which may be controlled, as in the first embodiment.

Figure 3:
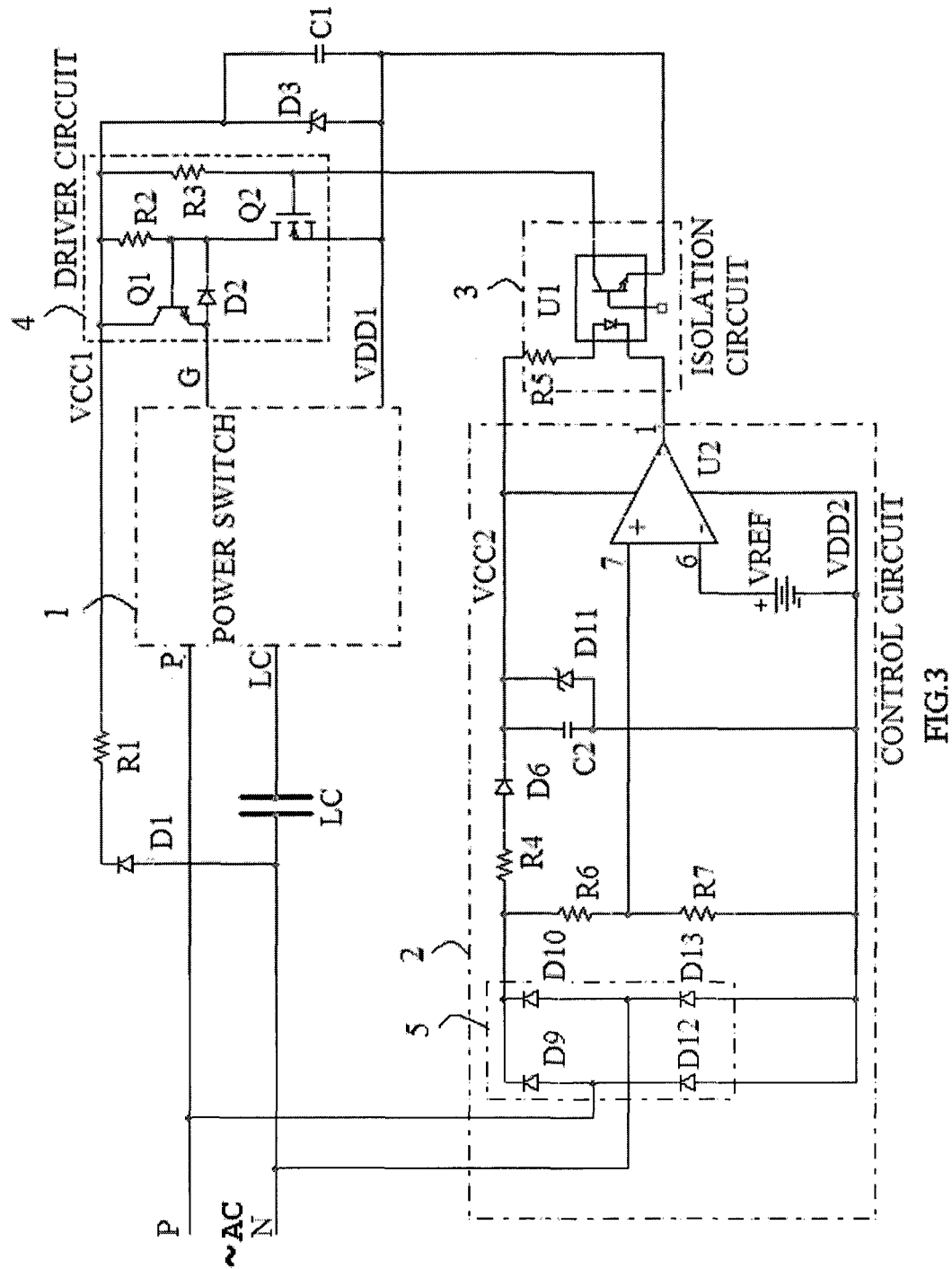
FIG. 3 is an electrical diagram of a transparency adjustment system constructed and operative in accordance with a first embodiment of the present invention.

In FIG. 3 one embodiment of a power dimmer which controls AC current passing through an LC film, designated "LC" in the illustration, is shown.

The LC film may be connected serially to a power switch 1 and both may be connected to an AC source between inputs P and N, such as mains, as shown. The power switch 1 may be controlled by a control circuit 2. Typically, through an isolation circuit 3 comprising optocoupler U1 and resistor R5, control circuit 2 generates voltage pulses which are amplified by driver circuit 4 and applied to power switch 1 between gate G and VDD1 nodes, e.g. as aforementioned.

Driver voltage between VCC1 and VDD1 may be provided, which is regulated by diode zener D3 and smoothed by capacitor C1, and from which the driver circuit is fed. The driver voltage is typically but not necessarily obtained from AC input N via diode D1 and Resistor R1.

Control voltage between VCC2 and VDD2 feeding the control circuit may be regulated by zener D11 and smoothed by C2 and may be obtained through resistor R4 and diode D6 from a diode bridge, e.g. as formed by diodes D9, D10, D12 and D13 in the illustrated embodiment, which rectify input AC voltage.

The driver circuit may for example be implemented, as shown in FIG. 3, although this is not intended to be limiting, and may operate in the following way:

With optocoupler U1 not conducting, FET Q2 is typically saturated via resistor R3 and drives G input low via diode D2, switching the power switch off.

When the optocoupler U1 is conducting, Q2 is switched off and the G input of the power switch is charged from VCC1 by the emitter follower comprising transistor Q1 and resistor R2.

The LC film may comprise any conventional LC film (Liquid Crystal), STF (switchable transparent film), or PDLC (Polymer Dispersed Liquid Crystal) film such as but not limited to Citala's P1, V4, V6, G4 and G6 films or ABT (All Brilliant Technology)'s SFT films. It is believed that the following commercially available films are also suitable implementations, mutatis mutandis of the LC film described herein: Polytron Technologies's Polyvision, LC films available from Iglass, Hanwha Polydreamer's Art-Vu film and Saint Gobain's PRIVA-LITE. The term "LC film" or "liquid crystal film" or "STF film" is intended to include any film that changes its transparency from opaque to transparent when electrical voltage is applied. Such films usually include the following layers: a first PET film layer, a first conductive coating, a polymer layer having liquid crystal particles, a second conductive coating and a second PET film layer.

The control circuit may operate in the following way, with reference to the timing diagram graphs of FIG. 4:

Graph A of FIG. 4 depicts input AC voltage present at inputs P and N, e.g. as shown in FIG. 3.

Typically, such AC voltage is rectified e.g. by a diode bridge 5 and after being scaled down by a voltage divider e.g. formed by resistors R6 and R7, is applied to one input 7 of comparator U2. Another input 6 of the comparator U2 is fed by reference DC voltage Vref.

The Vref may be constant voltage and may be obtained, for example, from a voltage regulator in cases where the LC film is powered by constant voltage. Alternatively, Vref may be adjustable in the case of a dimmer, and obtained for example from a potentiometer or DAC (digital to analog converter).

Typically, from time t0, when the AC voltage crosses zero, until time t1, the voltage at positive input 7 of comparator U2 is less than at negative input 6, and output 1 is at a logic low state, causing optocoupler's U1 to conduct, e.g. as illustrated in graph B of FIG. 4. Conducting of U1 applies via the driver circuit 4 high level to the G input of power switch 1 (see graph C of FIG. 4), which conducts charging capacitance of the LC film by increasing AC voltage to value V1, thereby to provide effective programming by Vref—e.g. as illustrated in graph E of FIG. 4. From time t1 until t2 the positive input 7 prevails, causing comparator U2 to change its state to logic high, and as a consequence, power switch 1 is turned off, thus current flow charging capacitance of the LC film ceases.

Figure 5:
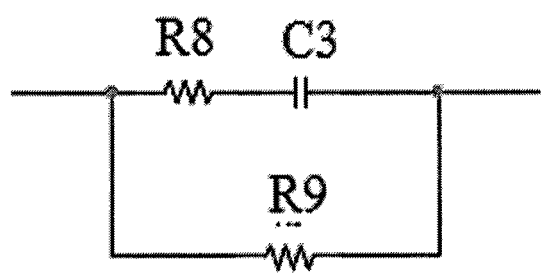
FIG. 5 is an electrical equivalent circuit of a physical element, such as but not limited to an LC film, behaving like a capacitive load, e.g. a complex RC load, for which certain embodiments of the present invention such as the embodiments of FIGS. 3, 7, 10 and 11, are applicable.

The capacitance of the LC film with no current flow through it, typically keeps the level of accumulated voltage unchanged until time t2. This is the case providing the time constant R9*C3 in FIG. 5 representing electrical equivalent circuit of an LC film is at least two orders larger than AC voltage time period. At time t2, the decreasing waveform at the positive input 7 of the comparator U2 equals to Vref applied to negative input 6. This causes comparator U2 to change state, turning power switch 1 on, and thus voltage on LC film starts to decrease, being equal to decreasing AC voltage. Because at t1 the instant value of AC voltage was equal to voltage on LC film, and during the time interval from t1 to t2 the voltage on film was unchanged, at t2 decreasing AC voltage will once again be equal to the LC film voltage, so turning on power switch 1 is effectively performed under zero voltage crossing (ZVC), meaning that at this instant the difference on the power switch is zero.

In graph D of FIG. 4, voltage on across terminals P and LC of power switch 1 is depicted. In graphs C and D of FIG. 4, it is apparent that at t2 instant, when power switch 1 is turned ON by voltage applied to G input, the voltage across power switch 1 is zero. ZVC effectively prevents undesirable current transients that otherwise occur when turning the capacitive load on. From time t2 and till t3, the power switch is kept in ON state. Thus, capacitance of the LC film is recharged from a positive V1 to a negative V2, the absolute value of which is equal to that of V1.

Graph F of FIG. 4 depicts current flowing through the LC film. During the time interval from t0 till t1 the power switch 1 is ON and a positive current flows through the LC film, the value of which is proportional to the LC film capacitance and speed, with which AC voltage, applied to the LC film, is increased. During the interval from t1 till t2, the LC film voltage is unchanged, as no current flows through the film. From t2 and till t3 voltage on the LC film decreases, reversing current through the film.

The embodiment of FIG. 3 has been found to work well with pure capacitive loads, based on the assumption that the LC voltage is not changed while the power switch is in an off state, making it possible to use comparator U2 both for programming dimmer voltage and for discovering the aforementioned zero voltage crossing condition, at which the power switch may be turned on.

However, an LC film may be more realistically represented by a complex capacitive-resistive impedance combination of capacitive and resistive components, as shown in FIG. 5. In FIG. 5, an LC film is represented by a serial connection of distributed capacitance and resistance, (capacitor C3 and resistor R8 respectively), which are bypassed by distributed resistance R9. Because of R9 the voltage stored by capacitor C3 is typically discharged to some degree during the off state of power switch 1.

While it is feasible to use the embodiment of FIG. 3 for powering the LC film, it might prove desirable to discover the ZVC condition by directly monitoring this condition, rather than by use of indirect assumptions as to when this condition occurs.

In graph E of FIG. 6 a waveform obtained on an LC film having a model as shown in FIG. 5, is depicted. The capacitance of the LC film (C3 in FIG. 5) is charged to level V1 during which power switch 1 conducts (from t0 to t1), and then is discharged internally to level V2 via parallel resistance (R9 in FIG. 5), when power switch 1 stays at a high impedance state (from t1 to t2). When power switch 1 is turned on again at t2 instant, AC voltage being at V1 level is higher than V2, thus causing the LC film capacitance to be quickly charged to V3 level (roughly equal to V1) (see graph E of FIG. 6), and generating current transients I2 which are significantly higher than nominal I1, as depicted in graph F of FIG. 6.

Graphs A-D of FIG. 6 show waveforms of input AC voltage, inputs of comparator U2A, G input of power switch 1 and voltage across P and LC terminals of power switch 1 respectively. Referring to the graph D of FIG. 6, it is appreciated that power switch 1 is turned ON when still subjected to voltage V4, and thus the ZVC condition is not fulfilled.

Figure 7:
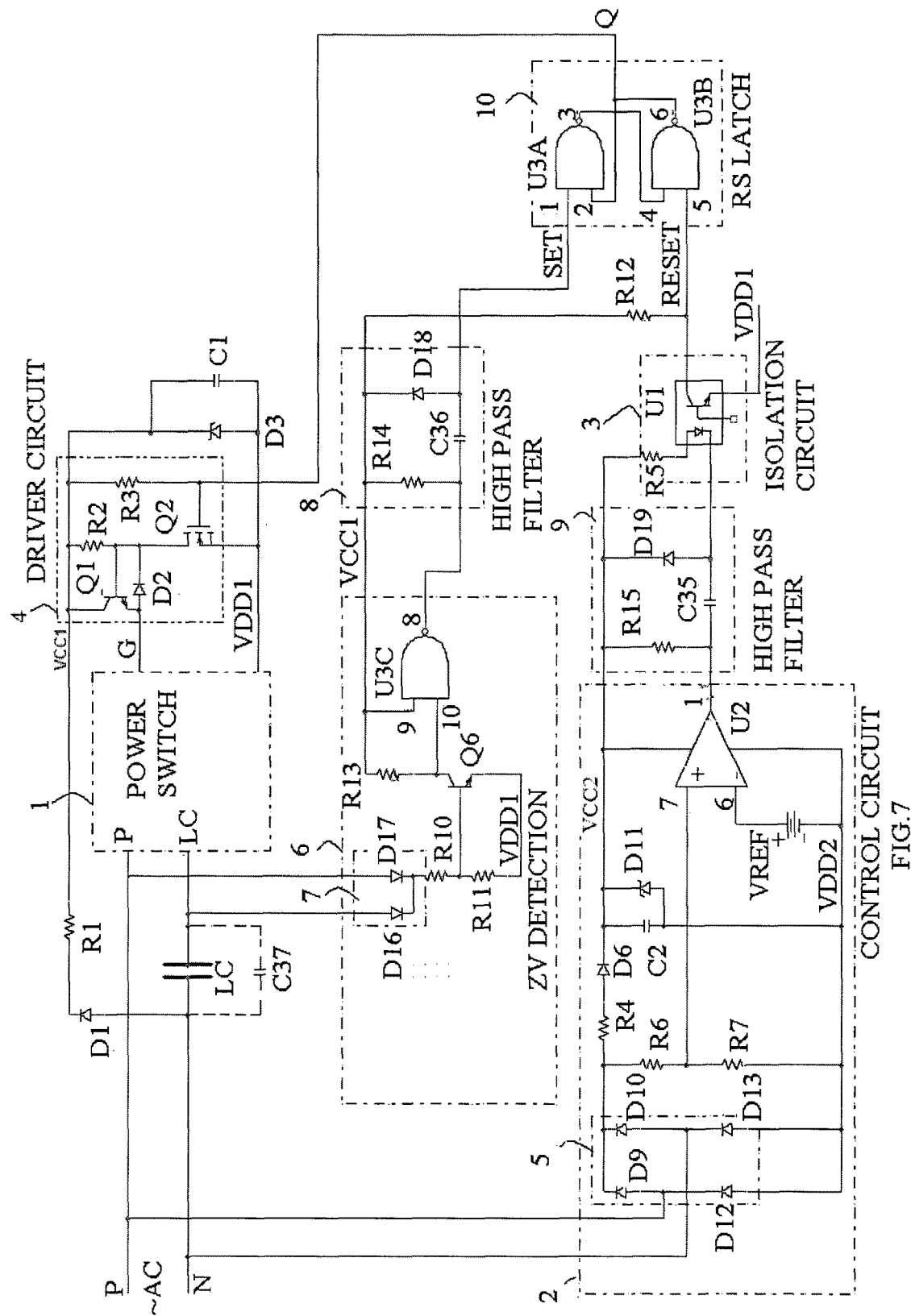
FIG. 7 is an electrical diagram of a transparency adjustment system constructed and operative in accordance with a second embodiment of the present invention.

An additional embodiment depicted in FIG. 7 may be useful in overcoming the abovementioned shortcoming.

In FIG. 7 ZV (zero voltage) detection circuit 6 is added and may for example include some or all of: diode D16, D17, resistor divider R10, R11, transistor Q6, pull up resistor R13 and inverting gate U3C. Diode bridge 7, is built around diodes D16, D17, and complemented by diodes D6 and D7 or body diodes of MOSFET's Q4 and Q5 of power switch 1 (e.g. see FIGS. 2A and 2B). The diode bridge 7 typically monitors AC voltage applied between P and LC terminals of power switch 1, and rectifies and feeds this AC voltage through a voltage divider (e.g. resistors R10, R11) to the base of transistor Q6. The Signal on collector Q6 is inverted by gate U3C. When voltage across power switch 1 (terminals P and LC) drops nearly to zero, transistor Q6 stops conducting and the collector of Q6 rises to high. Low-to-high transition on the collector of Q6 is inverted by U3C and transferred via high pass filter 8. High pass filter 8 is low going edge sensitive and may for example comprise resistor R14, capacitor C36 and diode D18 as shown. Low going pulse sets RS Latch circuit 10 (which may for example comprise two NAND gates (U3A and U3B)) to logic 0 level at terminal Q, thus turning power switch 10N via driver circuit 4, which applies high level to input G of the power switch 1.

Graph A of FIG. 8 shows input AC voltage. In graphs B and C of FIG. 8, the output of ZV detection circuit and corresponding SET signals are depicted.

When voltage on AC film reaches a level programmed by control circuit 2, output 1 of comparator U2A becomes low. High-to-low transition at output1 of U2A is transferred via high pass filter 9, similar to aforementioned high pass filter 8 and through isolation circuit 3 resets RS Latch circuit, which, through driver circuit 4, turns off power switch 1.

In graphs D and E, respectively, of FIG. 8, output of the U2A and RESET signals are shown.

Graph F of FIG. 8 shows control G input of power switch 1, which is set and reset by SET and RESET signals respectively.

Voltage across power switch 1 is depicted in graph G of FIG. 8. It is apparent from the waveform that power switch is switched ON at zero voltage instant.

Corresponding LC film voltage and current waveforms are depicted in graphs H and I, respectively, of FIG. 8.

Because of discharging of the LC film capacitance, in some cases it might prove beneficial to add an external capacitor connected in parallel to the LC film—e.g. see C37 in FIG. 7. This capacitor will decrease voltage decay during OFF time of the power switch at the expense of extra current through power switch 1.

Figure 9A:
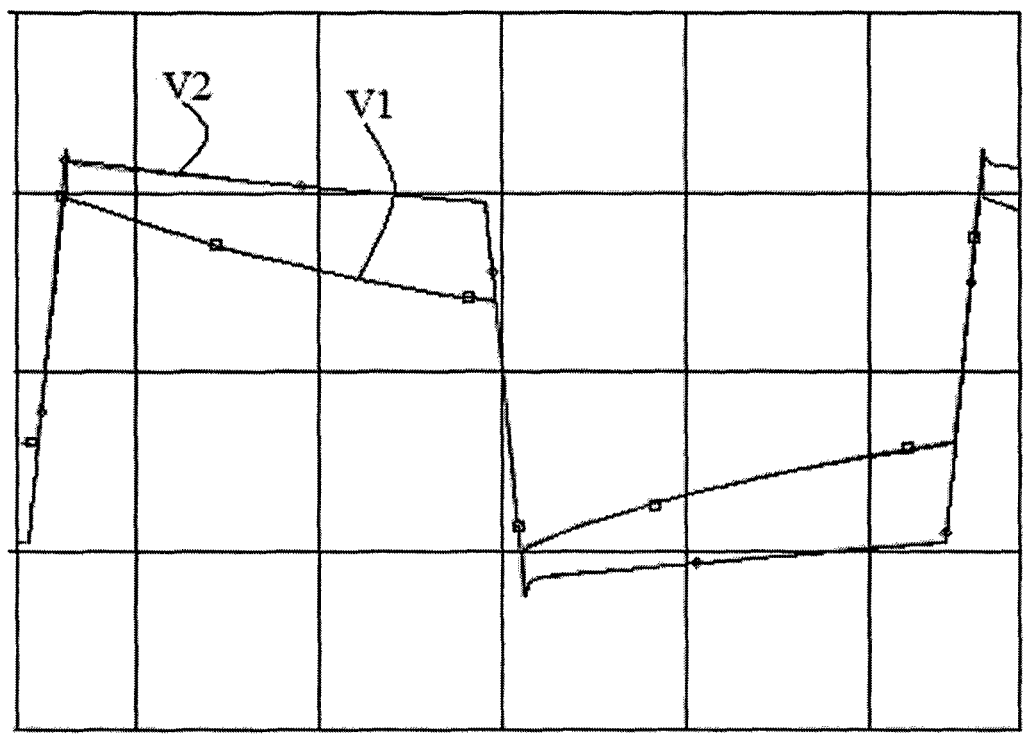
FIG. 9 includes graphs A and B representing voltage on an LC film and current through a power switch provided in accordance with certain embodiments, before (graph V1, and I1) and after (graph V2 and I2) adding an external capacitor.
Figure 9B:
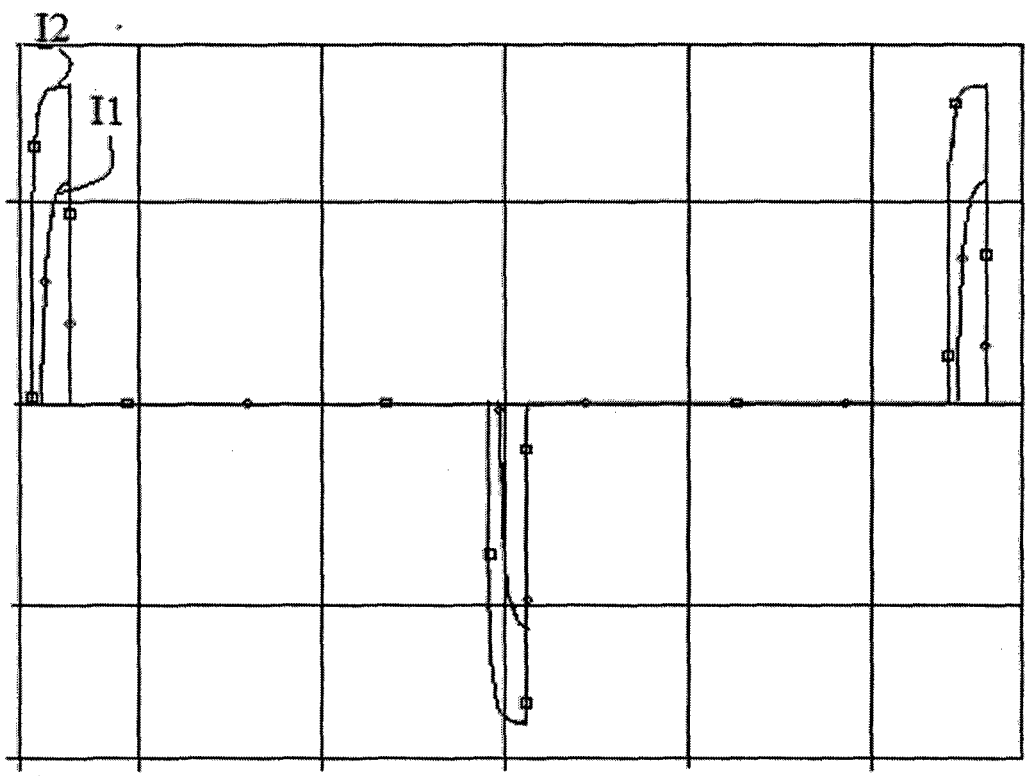

Graphs A and B of FIG. 9 depict comparative waveforms with and without provision of an external capacitor, respectively. In graph A of FIG. 9, V1 and V2 are graphs of voltages on the LC film with and without external capacitor C37, respectively. In graph B of FIG. 9, I1 and I2 are graphs of currents through the power switch 1 with and without external capacitor C37, respectively.

Advantages of certain embodiments of the present invention include the following: firstly, current of an LC film flows in both directions through the same pass. Furthermore, a power switch is controlled by a single control circuit. Both these features ensure that no DC current and associated DC voltage are present to damage the LC film, as opposed to prior art shown in FIG. 1.

The apparatus shown and described herein or portions thereof may optionally reside in an enclosure, such as but not limited to an electrical socket, a wall mountable electrical switch structure, or a box intended for placement at a location which is not easily accessible.

The LC film may be laminated between two glass panes with two protruding electrodes or wires which may be connected to the dimmer (transparency controlling) circuitry. The resulting laminated glass can be used as a glass pane e.g. for a window or door or any other product having a transparent pane or component.

The Circuitry of FIG. 3 makes assumptions, based on prediction, regarding ZVC instead of directly monitoring the condition. Typically, prediction is based on the assumption that LC voltage during "floating" (time interval t1-t2 in FIG. 4E) does not change. This prediction is accurate for pure capacitance load, but is typically not good enough for complex load (e.g. see t1-t2 interval in graph E of FIG. 6).

The capacitor characterizing certain embodiments, e.g. capacitor C37 in FIG. 7, may or may not be used, depending e.g. on the type of LC film and its geometry, e.g. the proportion between its length vs width. Irrespective of whether or not capacitor C37 is provided, the dimmer may be implemented as in FIG. 7.

It is appreciated that the serial connection of power switch to an LC film shown and described herein is not intending to be limiting. For example, the scope of present invention includes a dimmer (which may function, if desired, merely as an on/off switch) which is suitable for dimming (and for merely powering on and off) of a capacitive load such as but not limited to liquid crystal (LC) film. Such a dimmer may be implemented using, say, inverters well known in industry and their derivatives which may, but need not, be connected to the load serially. Such inverters are typically more complex hence more costly than a dimmer connected in series with the load e.g. as shown and described herein.

Typically, the user pushes a button or turns a knob, or a PC e.g. smart home system initiates a signal which serves as input to the control circuit of FIG. 3, 7, 10 or 11. The control circuit translates this input into timing according to which the power switch is switched on and off within each line frequency cycle, e.g. 50 Hz in Europe or 60 Hz in USA. When the power switch is switched on, the voltage is applied via the power switch to the load. The amount of voltage applied to the load is dependent on the duration of time for which the power switch is switched on.

Typically, LC film cannot tolerate direct current and is powered by AC substantially alone with virtually no DC.

It is appreciated that any of the power dimmers shown and described herein may if desired, function as on/off switches rather than as dimmers (a dimmer has many ON states, whereas an ON/OFF switch has only one on state), e.g. for bathrooms, changing rooms in clothing stores, and so forth. When an on/off switch mode of operation is desired, the control circuit's comparator input connected to a DC reference voltage Vref (e.g. as shown in FIG. 3), typically has one fixed value, e.g. 5V, or zero, which, when set high or low, causes the load, e.g. an LC film, to assume a relatively e.g. fully transparent or fully opaque state, respectively. Alternatively, when dimming functionality is desired, Vref alternates between low and high values in order to dim the LC film.

More generally, an apparatus for use in controlling the degree of transparency of an object by applying a truncated periodical wave signal in order to control voltage applied to a liquid crystal may be designed to achieve a controllable multiplicity degrees of transparency and an opaque state, e.g. like a dimmer, or may be designed to achieve only two states of transparency: namely a maximum transparency and an opaque state.

Figure 10:
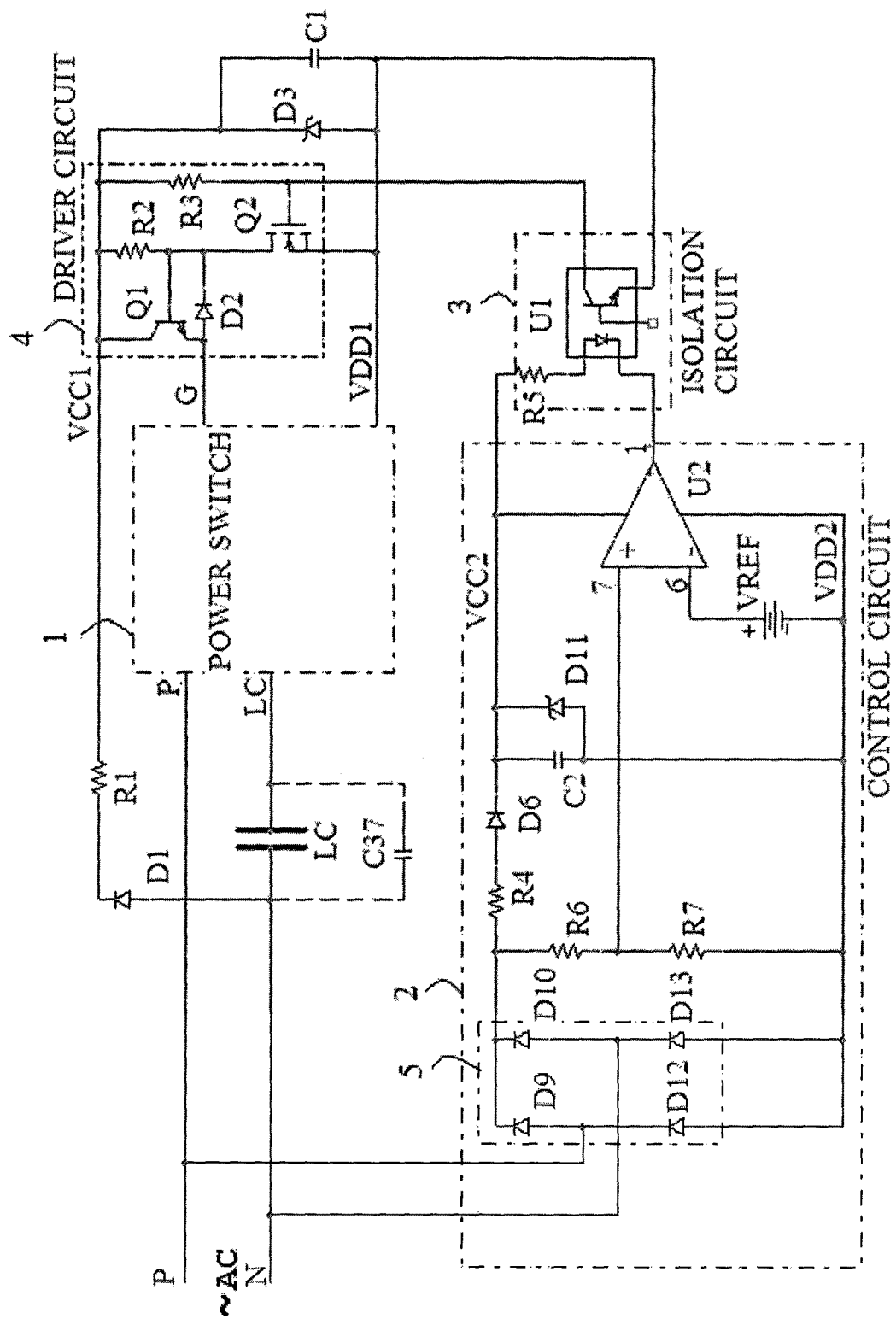
FIG. 10 is an electrical diagram of a transparency adjustment system which is similar to the embodiment of FIG. 3 but includes an additional capacitor C37.

FIG. 10 is a diagram of another embodiment of the present invention which is similar to the embodiment of FIG. 3 but for the added capacitor C37. It is appreciated that addition of Capacitor C37 to the apparatus of FIG. 3 as shown in FIG. 10 may further increase the current peaks shown in FIG. 6F.

Figure 11:
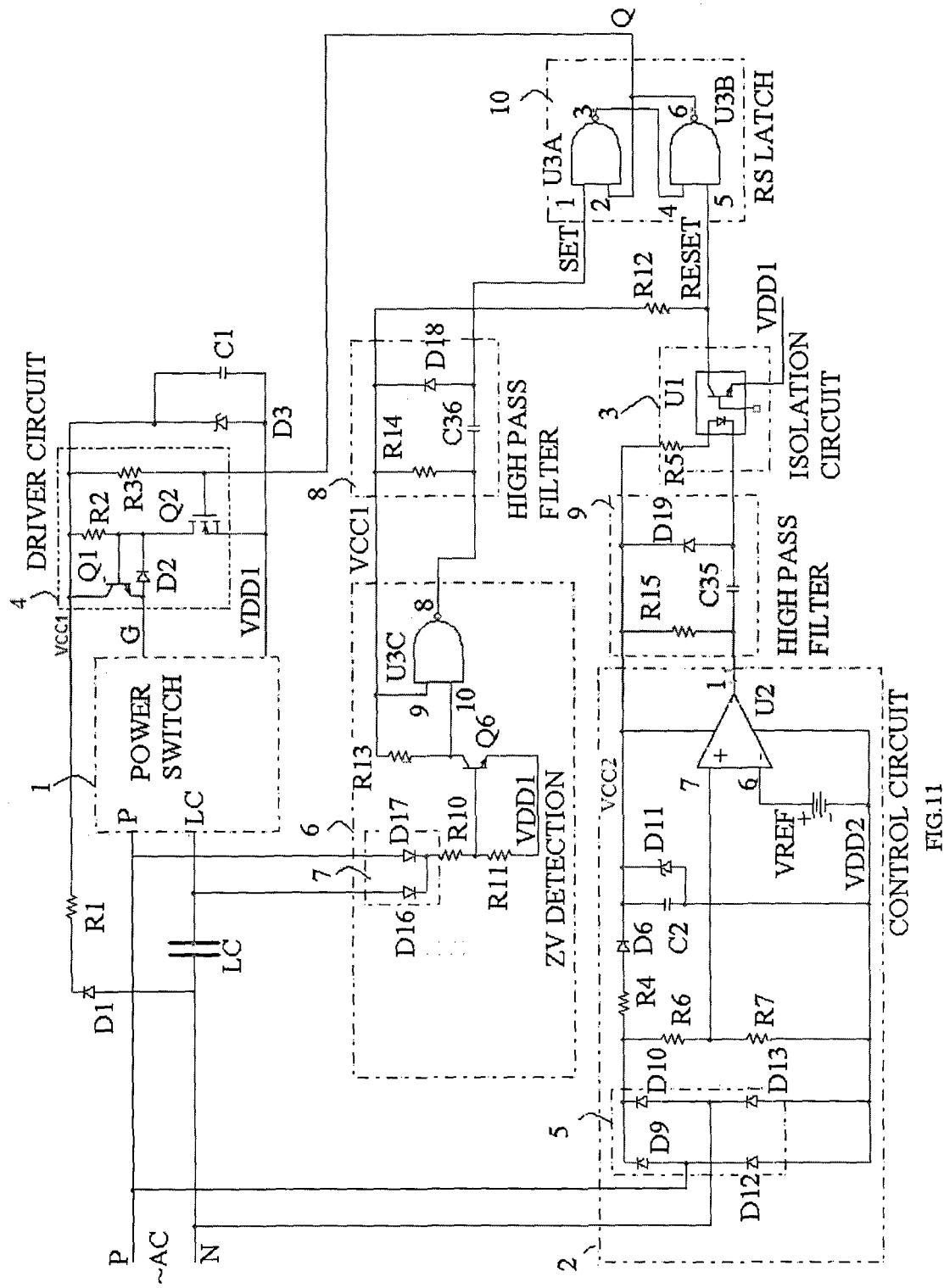
FIG. 11 is an electrical diagram of a transparency adjustment system similar to the embodiment of FIG. 7 but lacking capacitor C37.

FIG. 11 is a diagram of another embodiment of the present invention which is similar to the embodiment of FIG. 7 except that capacitor C37 is omitted.

In the embodiments of FIGS. 3, 7, 10 and 11, it is appreciated that the reference voltage VREF may be user-controlled via any suitable typically manually manipulated device such as a potentiometer or a suitable digital device such as DAC or through PC or by suitable means such as but not limited to "smart house" software. It is appreciated that some or all of the circuitry shown and described herein may be integrated into one or more integrated circuits.

It is appreciated that a variable transformer e.g. variac may be employed to effectively "dim" or control the degree of transparency of an LC film, mechanically, however, this is a relatively cumbersome and unsatisfactory arrangement.

It is appreciated that, in order to drive the load, the output voltage which is applied to the load, is ideally AC voltage only, and practically, may include a very small, generally undesirable DC voltage component, whose amount is typically less than 1% or less than 0.5% or less than 0.3% or less than 0.1% of the amount of AC voltage.

Similarly, regarding ZVC (zero-voltage-crossing) prediction and detection circuitries, the power switch is typically not turned on unless, desirably, zero or, less desirably, the presence of only very little voltage e.g. typically less than 1% or less than 0.5% or less than 0.3% or less than 0.1% of the amount of AC voltage, is predicted by the ZVC (zero-voltage-crossing) prediction circuitry to be present across the power switch.

The present invention is likely to have various alterations, modifications, and improvements which will readily occur to those skilled in the art.

Such alterations, modifications, and improvements are intended to be part of this disclosure, and are intended to be within the spirit and the scope of the present invention. Accordingly, the foregoing description is by way of example only and is not intended to be limiting.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention such as the "smart house" software referred to above, including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques. The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A transparency adjustment system comprising:
   a. a transparent physical element whose electrical behavior is that of a capacitive load; power dimmer apparatus operative to provide AC current to the transparent physical element to generate a set of transparency states including a plurality of transparency states other than full transparency;
   b. a power switch powering said load; and
   c. a control circuit controlling said power switch to turn on and off at selectable times;
   wherein the control circuit includes a comparator operative to receive and to compare:
   d. an incoming level of AC voltage; and
   e. a user-selected reference voltage;
   and operative, when the incoming level of AC voltage reaches the user-selected reference voltage, to generate an output triggering truncation of sinusoidal AC voltage applied to the load.

2. A system according to claim 1 wherein said transparent physical element comprises a liquid crystal (LC) film.

3. A system according to claim 2 wherein the power switch comprises a pair of anti-serial MOSFET switches connected in series with the LC film.

4. A system according to claim 2 wherein said liquid crystal film is laminated into a glass object thereby to control transparency of the glass object.

5. A system according to claim 4 wherein said glass object forms one of: a window pane, a window, a glass door pane, and a glass door.

6. A system according to claim 5 wherein the window pane is mounted in a building.

7. A system according to claim 5 wherein the window pane is mounted in a vehicle such as an automobile, a marine vehicle and an aircraft.

8. A system according to claim 2 wherein a maximum voltage level rating is defined for the liquid crystal film and wherein the power dimmer apparatus has a predetermined maximum voltage level which does not exceed the liquid crystal film's maximum voltage level rating.

9. A system according to claim 1 wherein said set of transparency states also includes a state of full transparency.

10. A system according to claim 1 wherein said load comprises a complex capacitor/resistor load.

11. A system according to claim 10 and also comprising a capacitor disposed in parallel to the complex load and operative to increase AC voltage applied to the complex load.

12. A system according to claim 1 wherein, in order to drive the load, an output voltage which is applied to the load, comprises AC voltage, such that DC voltage, if any, is at most 0.5% of the amount of AC voltage.

13. A system according to claim 1 wherein the power switch is connected in series with said load.

14. A system according to claim 1 wherein the power switch comprises:
   a diode bridge; and
   a MOSFET switch connected serially with the load via the diode bridge.

15. A system according to claim 1 wherein AC voltage applied to the load is of a quasi trapezoidal form.

16. A system according to claim 1 wherein AC voltage applied to the load has a truncated sinusoidal form which is truncated at a voltage level determined by the control circuit and applied via the power switch.

17. A system according to claim 1 wherein the power switch has an input point comprising a gate and wherein the control circuit is connected to the power switch via a driver circuit controlling the power switch's input point.

18. A system according to claim 17 wherein the control circuit is connected to the driver circuit via an isolation circuit.

19. A system according to claim 1 additionally comprising ZVC (zero-voltage-crossing) prediction circuitry, wherein the power switch is not turned on unless zero or at most presence of less than a predeterminedly small level of voltage is predicted by the ZVC prediction circuitry to be present across the power switch.

20. A system according to claim 19 wherein the ZVC (zero-voltage-crossing) prediction circuitry assumes that LC voltage during a "floating" time interval will not change.

21. A system according to claim 1 additionally comprising ZVC (zero-voltage-crossing) detection circuitry connected across the power switch, and wherein the power switch is not turned on unless very little voltage, if any, is detected by the ZVC detection circuitry across the power switch.

22. A system according to claim 21 wherein the ZVC detection circuitry is operative to measure positive and negative half cycles of a sine input voltages across terminals P-VDD1 and LC-VDD1 of the power switch, respectively.

23. A system according to claim 21 wherein said capacitive load comprises a complex capacitor/resistor load, the system also comprising a capacitor in parallel to the complex capacitive/resistive load.

24. A system according to claim 1 wherein the power dimmer apparatus is manually controllable by a user.

25. A system according to claim 1 wherein the power dimmer apparatus is controllable by a computerized system such as a PC or smart home system.

26. A system according to claim 1 which changes the state of the physical element from transparent to translucent in a single step rather than gradually.

* * * * *